United States Patent
Zhu

(10) Patent No.: US 10,824,208 B2
(45) Date of Patent: Nov. 3, 2020

(54) ANTENNA STRUCTURE AND WIRELESS COMMUNICATION DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jian-Guo Zhu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/369,039

(22) Filed: Mar. 29, 2019

(65) Prior Publication Data

US 2020/0233468 A1 Jul. 23, 2020

(30) Foreign Application Priority Data

Jan. 17, 2019 (CN) .......................... 2019 1 0045300

(51) Int. Cl.
| | | |
|---|---|---|
| *H01Q 21/06* | (2006.01) | |
| *H04W 88/06* | (2009.01) | |
| *H04B 7/0404* | (2017.01) | |
| *G06F 1/16* | (2006.01) | |
| *H01Q 21/00* | (2006.01) | |
| *H01Q 1/24* | (2006.01) | |

(52) U.S. Cl.
CPC .......... *G06F 1/1698* (2013.01); *H01Q 1/243* (2013.01); *H01Q 21/0006* (2013.01); *H04W 88/06* (2013.01)

(58) Field of Classification Search
CPC ..... H04W 16/28; H04W 40/06; G06F 1/1698; H01Q 1/243; H01Q 21/0006
See application file for complete search history.

(56) References Cited

U.S. PATENT DOCUMENTS

| | | | | |
|---|---|---|---|---|
| 2009/0309799 | A1* | 12/2009 | Hossain | H01Q 19/005 343/754 |
| 2010/0245205 | A1* | 9/2010 | Tran | H01Q 1/2266 343/861 |
| 2013/0207877 | A1* | 8/2013 | Shtrom | H01Q 21/10 343/893 |
| 2015/0035714 | A1* | 2/2015 | Zhou | H01Q 13/106 343/767 |
| 2016/0181169 | A1* | 6/2016 | Huang | H01L 23/49894 257/772 |
| 2017/0201011 | A1* | 7/2017 | Khripkov | H01Q 1/50 |
| 2017/0346179 | A1* | 11/2017 | Wu | H01Q 21/062 |

* cited by examiner

*Primary Examiner* — San Htun
(74) *Attorney, Agent, or Firm* — ScienBiziP, P.C.

(57) ABSTRACT

An antenna structure able to function in a 5G environment is disposed on a supporting member within an electronic device. The antenna structure includes a large number of antenna arrays, the antenna arrays include antenna units arranged in a line, and current is fed to each of the antenna units. A wireless communication device with enhanced transmission rates is also provided.

5 Claims, 3 Drawing Sheets

ANTENNA STRUCTURE AND WIRELESS COMMUNICATION DEVICE USING THE SAME

FIELD

The subject matter herein generally relates antenna structure and wireless communication device using the same.

BACKGROUND

Overall appearance, weight, and dimensions of wireless communication devices are important. As the wireless communication devices become lighter and thinner, an area of an antenna substrate becomes limited. In order to adapt to the development of 5G communication technology and the requirement of high transmission rates of 5G configuring more antenna elements in the limited area becomes important.

Therefore there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
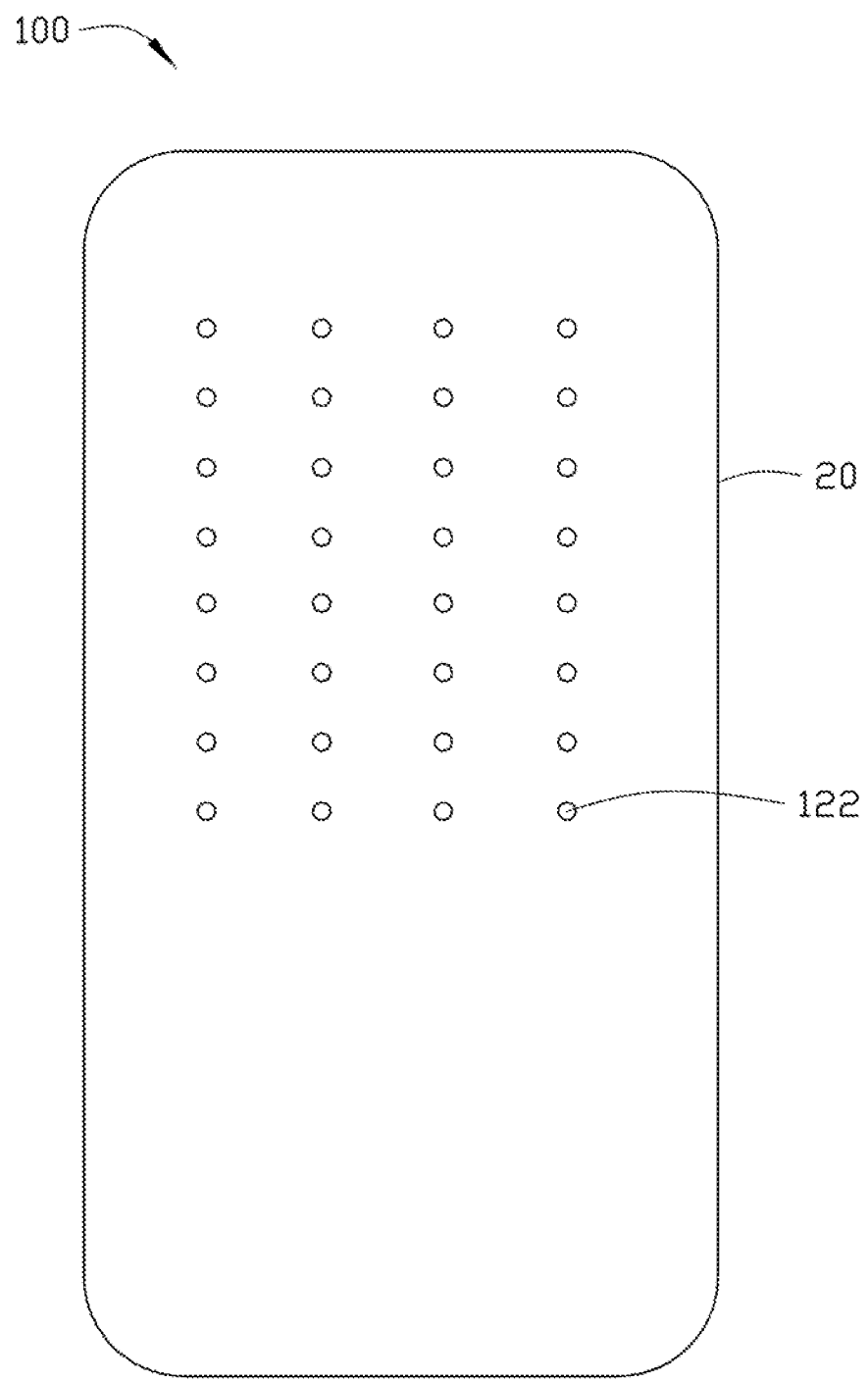
FIG. 1 is an isometric view of an embodiment of a wireless communication device using an antenna structure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
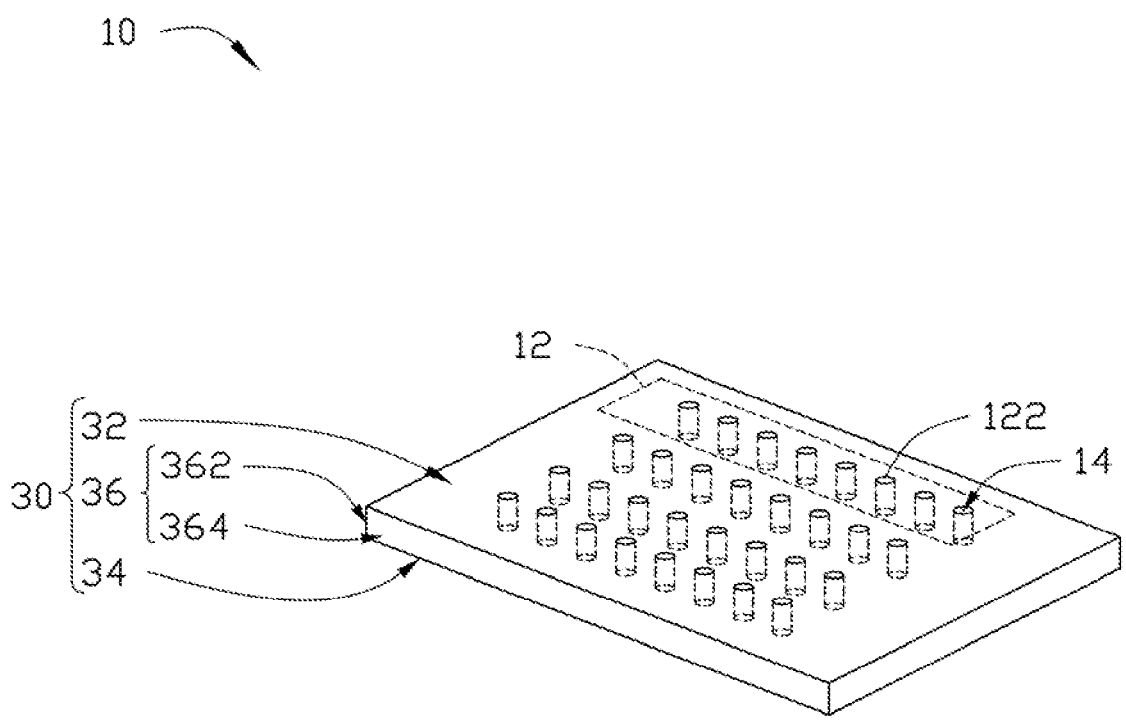
FIG. 2 is an isometric view of an embodiment of the antenna structure of FIG. 1.

FIGS. 1 and 2 illustrate a wireless communication device 100 in accordance with an embodiment of the present disclosure. The wireless communication device 100 includes an antenna structure 10 and a housing 20. The wireless communication device 100 can further include, but is not limited to, other mechanical structures, electronic components, modules, and software.

In at least one embodiment, the housing 20 is made of a ceramic material or a glass material or other non-conductive material.

The antenna structure 10 is configured to transmit and receive wireless signals. The wireless communication device 100 can be a mobile phone, a personal digital assistant, or an MP3 player, for example. The antenna structure 10 can function within a 5G smart phone or as an Internet of Things (JOT) intelligent terminal.

In at least one embodiment, the antenna structure 10 is disposed on a supporting member 30.

The antenna structure 10 includes a plurality of antenna arrays 12 and a plurality of via holes 14. Each antenna array 12 includes a plurality of antenna units 122 arranged in a line.

In the antenna structure 10, the number of via holes 14 and the number of the antenna units 122 is the same. Each of via holes 14 corresponds to one antenna unit 122. The antenna unit 122 is embedded in the housing 20 by printing or etching.

In an embodiment, the number of the antenna units 122 in each of the antenna arrays 12 is the same. In other embodiment, the number of the antenna units 122 in each of the antenna arrays 12 may be different.

In an embodiment, the antenna structure 10 includes four antenna arrays 12. Each antenna array 12 includes eight antenna units 122.

In an embodiment, the supporting member 30 can be a flexible printed circuit board (FPCB).

The supporting member 30 includes an upper surface 32, a lower surface 34 opposite to the upper surface 32, and a side wall 36. The side wall 36 connects the upper surface 32 and the lower surface 34. The side wall 36 includes two first walls 362 and two second walls 364.

The two first walls 362 are positioned opposite to each other. The two second walls 364 are positioned opposite to each other. The two first walls 362 and the two second walls 364 effectively form a frame (not shown). The frame is substantially rectangular and is configured to hold the antenna structure 10.

The plurality of antenna arrays 12 is disposed on the upper surface 32 or the lower surface 34 of the supporting member 30.

The via hole 14 passes through from the upper surface 32 to the lower surface 34. The plurality of via holes 14 corresponds to the antenna units 122.

When current is fed to each of the antenna units 122, each of the antenna units 122 emits a wireless signal.

In at least one embodiment, each antenna unit 122 is made of a conductive material.

Figure 3:
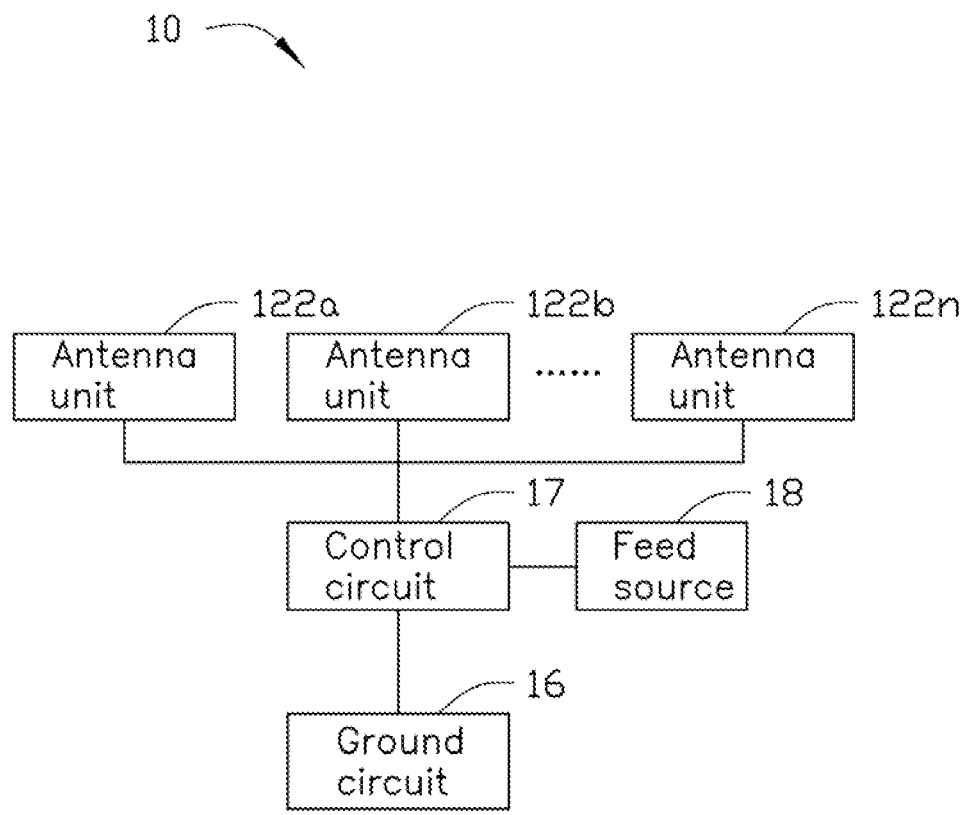
FIG. 3 a block diagram of an embodiment of the antenna structure of FIG. 1.

FIG. 3 illustrates that the antenna structure 10 further includes a ground circuit 16, a control circuit 17, and a feed source 18.

In at least one embodiment, the ground circuit 16 is electrically connected to each of the via holes 14 for grounding the antenna units 122.

The control circuit 17 is electrically connected to each of the antenna units 122 through each of the via holes 14.

The control circuit 17 is configured to perform transmission and reception control processing and impedance matching for the radiation frequency band of the antenna structure 10.

The feed source 18 is electrically connected to the each of the antenna units 122 through the control circuit 17. The feed source 18 feeds current to each of the antenna units 122.

When current is fed through each of the via holes 14 to each of the antenna units 122, each of the antenna units 122 is excited to emit a wireless signal Each of the antenna units 122 is embedded in the housing 20 by printing or etching, and the transmission rate of signals is increased.

In at least one embodiment, the housing 20 can be made of a ceramic material.

In at least one embodiment, the housing 20 can be made of a glass material.

Thereby, the wireless communication device 100 has resistance to impacts and abrasions, has heat dissipating properties and is smooth to the touch.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure disposed on a supporting member, comprising:
   a plurality of antenna arrays, wherein each of the antenna arrays comprises a plurality of antenna units arranged in a line;
   wherein when a current signal is fed to each of the antenna units, each of the antenna units emits a wireless signal;
   wherein the supporting member comprises an upper surface, a lower surface opposite to the upper surface, and a side wall, the side wall connects the upper surface and the lower surface, and the plurality of antenna arrays are disposed on the upper surface or the lower surface;
   wherein the antenna structure further comprises a plurality of via holes, each of the via holes corresponds to each of the antenna units, each of the via holes passes through from the upper surface to the lower surface, each of the via holes is electrically connected to each of the antenna units, the current signal is fed to each of the antenna units through each of the via holes;
   wherein the antenna structure further comprises a control circuit, the control circuit is electrically connected to each of the antenna units through each of the via holes, and the control circuit is configured to perform intelligent transmission and reception control and impedance match on the radiation frequency band of the antenna structure;
   wherein the antenna unit is embedded in the housing by printing or etching; and
   wherein the supporting member is a flexible printed circuit board.

2. The antenna structure of claim 1, wherein the antenna structure further comprises a feed source, and the feed source is electrically connected to the each of the antenna units through the control circuit.

3. The antenna structure of claim 2, wherein the feed source is configured to feed the current signal to each of the antenna units.

4. A wireless communication device, comprising:
   a housing; and
   an antenna structure disposed on a supporting member, comprising:
   a plurality of antenna arrays, wherein each of the antenna arrays comprises
   a plurality of antenna units arranged in a line;
   wherein when a current signal is fed to each of the antenna units, each of the antenna units emits a wireless signal;
   wherein each of the plurality of antenna units is printed or embedded in the housing;
   wherein the supporting member comprises an upper surface, a lower surface opposite to the upper surface, and a side wall, the side wall connects the upper surface and the lower surface, and the plurality of antenna arrays are disposed on the upper surface or the lower surface;
   wherein the antenna structure further comprises a plurality of via holes, each of the via holes corresponds to each of the antenna units, each of the via holes passes through from the upper surface to the lower surface, each of the via holes is electrically connected to each of the antenna units, the current signal is fed to each of the antenna units through each of the via holes;
   wherein the antenna structure further comprises a control circuit, and the control circuit is electrically connected to each of the antenna units through each of the via holes; wherein the control circuit is configured to perform intelligent transmission and reception control and impedance match on the radiation frequency band of the antenna structure;
   wherein the antenna unit is embedded in the housing by printing or etching; and
   wherein the supporting member is a flexible printed circuit board.

5. The wireless communication device of claim 4, wherein the antenna structure further comprises a feed source, and the feed source is electrically connected to the each of the antenna units through the control circuit; wherein the feed source is configured to feed the current signal to each of the antenna units.

* * * * *